Patented Dec. 30, 1930

1,787,069

UNITED STATES PATENT OFFICE

IVAN GUBELMANN AND ROBERT J. GOODRICH, OF SOUTH MILWAUKEE, AND WILLIAM DETTWYLER, OF MILWAUKEE, WISCONSIN, ASSIGNORS TO THE NEWPORT COMPANY, OF CARROLLVILLE, WISCONSIN, A CORPORATION OF DELAWARE

COLORING MATTER OF THE ANTHRACENE SERIES

No Drawing. Application filed December 11, 1926. Serial No. 154,304.

This invention relates to the manufacture of coloring matters of the anthracene series and more particularly to those in the anthraquinone benzacridone series.

It is a well known fact that anthraquinone 1:2 benzacridones may be made by the condensation of 1-chloro-anthraquinone-2-carboxylic acid with aniline, followed by water elimination. In an analogous manner, using a halogen substituted aniline, halogen substituted "acridones" have been prepared.

We have now found that these halogen substituted "acridones" may be further condensed with an amino-anthraquinone body, with the formation of an "imid", having the general type formula:

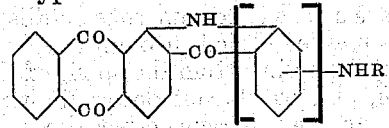

wherein "R" represents an anthraquinone body. We have further found that these "acridones" when made, as for instance from a meta-chloro- or bromo-aniline body, are particularly suitable for making valuable vat dyestuffs by conversion into imids of the general type formula given above and subsequent heating of the imids with metal chlorides.

The constitution of these final products is not known to us. It has been suggested in the literature (see German Patent 258,808) that reactions of this type result in compounds having both an acridone and an acridine ring. If this theory is correct, the formula of our final product, or at least one of the theoretically possible isomers, should be

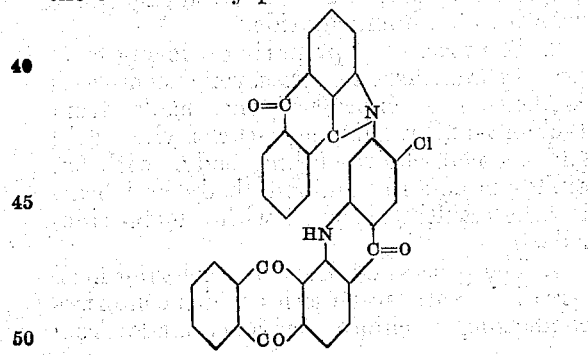

However it is also possible that the reaction results in the formation of a carbazole ring structure in which case the formula of the product would probably be as follows:

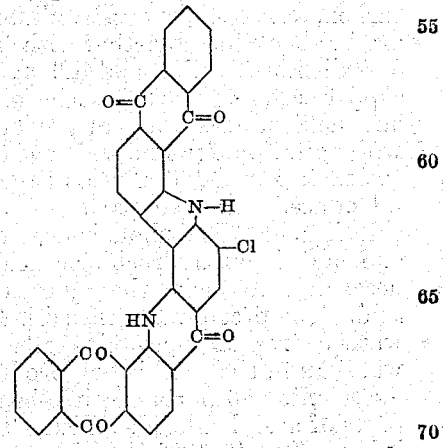

These vat coloring matters are, in general, dark brown powders, insoluble in water, alcohol, alkalies and dilute mineral acids; somewhat soluble in aniline, but readily soluble in concentrated sulphuric acid, imparting a brown color to the solution and in alkaline hydrosulphite, giving a violet colored vat, from which cotton is dyed violet, changing to a brown shade on treatment with suitable oxidizing agents.

In German Patent No. 258,808, is described a process of condensing by means of concentrated sulfuric acid an anthraquinonacridonyl-amino-anthraquinone obtained from alpha-amino-anthraquinone and a halogen anthraquinone-acridone, in which the halogen is para to the heterocyclic nitrogen. Our process differs therefrom in two respects, namely (1) we operate on an anthraquinonacridonyl - amino - anthraquinone obtained from alpha-amino-anthraquinone and a mono or dihalogen anthraquinone-acridone in which at least one halogen atom is in meta position to the heterocyclic nitrogen and (2) we use aluminum chloride as the condensing agent. The products produced by our method differ considerably in tinctorial value from the products of said German patent. If the amount of dyestuffs required to produce a dyeing of a given strength on the same weight of cotton cloth be taken as a criterion, the dyestuffs produced by our method are 2½ to 3 times as strong as the dyestuffs of said German patent. While some variation in tinctorial strength should have been expected due to the use of different starting materials, it was not to be foreseen that the difference would be manifold and in favor of the new dyestuffs.

Without limiting our invention to any particular procedure, the following examples, in which parts by weight are given, illustrate the application of our invention in the preferred form:

*Example I*

17 parts of 1-chloro-anthraquinone-2-carboxylic acid are dissolved in a mixture of 200 parts of water and 10 parts of sodium carbonate. 43.4 parts of sodium carbonate are further added together with 10.2 parts of 3:4 dichloro-aniline and 1.6 parts of basic copper acetate. The mass is heated to 103° C. and held at this temperature under reflux, with agitation, for 4 hours. The mass is then cooled to 25° C., filtered and the filter cake introduced into 150 parts of 3% hydrochloric acid. The whole is heated to boiling and additional hydrochloric acid added, if necessary, to make the mixture distinctly acid. The precipitate formed is filtered and washed free of inorganic salts with cold water and dried. This dry product is introduced into 120 parts of nitro-benzene and 9 parts of acetyl chloride added. The mixture is heated to 110–120° C. and held at this temperature for 2 hours. The whole is then cooled to 20° C., filtered at this temperature and the filter cake washed with 100 parts of alcohol. A dichloro acridone, namely chloro substituted anthraquinone 1:2 benzacridone, is thus obtained.

10 parts of this body are introduced into 100 parts of nitro-benzene, and 6 parts of alpho-amino-anthraquinone, 10 parts of finely ground sodium carbonate and 3 parts of basic copper acetate are added. The mixture is heated to 210° C. and refluxed with agitation at this temperature for 5 hours. The mass is then introduced into 300 parts of water and steam passed into the mixture until all the nitro-benzene has been removed. The aqueous suspension obtained is then made distinctly acid with hydrochloric acid and filtered hot. The filter cake is washed with hot water until free of inorganic salts, dried and finely ground.

10 parts of this finely ground product are further ground together with 20 parts of anhydrous aluminum chloride. The mixture is heated to 135° C., and kept at this temperature for 2 hours. The reaction mass is cooled, ground and introduced into 200 parts of 5% hydrochloric acid. The suspension is boiled for 30 minutes, filtered hot and the filter cake washed with hot water until free of inorganic salts. After drying and grinding, the coloring matter is obtained as a dark brown powder containing combined chlorine and having the characteristics mentioned above.

*Example II*

In an analogous manner to that of Example I, a coloring matter may be obtained free of combined chlorine by replacing the 3:4 dichloro-aniline used in that example with meta-chloro-aniline. The characteristics are, in general, the same.

*Example III*

In an analogous manner to that of Example I, a coloring matter may be obtained which dyes cotton a somewhat yellower shade by replacing the amount of aluminum chloride specified in Example I with 30 parts of anhydrous zinc chloride and 3 parts of water, and increasing the temperature from 135° C. to 160° C. The coloring matter so obtained contains combined chlorine and is similar in properties to the coloring matter obtained by Example I, but dyes cotton a yellower shade of brown.

It will be understood that in these examples, the corresponding bromo compounds may be substituted without essentially changing the results.

We are aware that numerous details of the process may be varied through a wide range without departing from the spirit of this invention, and we do not desire limiting the patent granted hereon otherwise than as necessitated by the prior art.

We claim as our invention:

1. The process of preparing coloring matters of the anthracene series, which comprises condensing an anthraquinone halogen substituted benzacridone which contains a halogen atom in meta position to the imino group in the benzene ring, with an amino anthraquinone body and heating the resulting product with a metal chloride.

2. The process of preparing coloring matters of the anthracene series, which comprises condensing an anthraquinone halogen substituted benzacridone which contains a halogen atom in meta position to the imino group in the benzene ring, with an amino anthraquinone body and heating the resulting product with aluminum chloride.

3. The process of preparing coloring matters of the anthracene series, which comprises condensing a chloro-acridone, made from 1-chloro-anthraquinone-2-carboxylic acid and a meta-chloro-aniline body, with an alpha-amino-anthraquinone body and heating the resulting product with a metal chloride.

4. The process of preparing coloring matters of the anthracene series, which comprises condensing a chloro acridone, made from 1-chloro-anthraquinone-2-carboxylic acid and a meta chloro-aniline body, with an alpha-amino-anthraquinone body and heating the resulting product with aluminum chloride.

5. The process of preparing coloring matters of the anthracene series, which comprises condensing a dichloro acridone, made from 1-chloro-anthraquinone-2-carboxylic acid and 3:4 dichloro aniline, with an alpha-amino-anthraquinone body and heating the resulting product with a metal chloride.

6. The process of preparing coloring matters of the anthracene series, which comprises condensing a chloro acridone, made from 1-chloro-anthraquinone-2-carboxylic acid and a meta-chloro-aniline, with alpha-amino-anthraquinone and heating the resulting product with a metal chloride.

7. As new articles of manufacture, the coloring matters of the anthracene series, which may be obtained by the process described in claim 1 and which coloring matters are, in general, dark brown powders insoluble in water, alcohol, alkalies and dilute mineral acids, somewhat soluble in aniline, but readily soluble in concentrated sulfuric acid forming a brown colored solution and giving with alkaline hydrosulphite a violet colored vat from which cotton is dyed violet, changing to a brown shade on treatment with suitable oxidizing agents.

8. As new articles of manufacture, the coloring matters of the anthracene series, which may be obtained from a di-chloroacridone, made from 1-chloro-anthraquinone-2-carboxylic acid and a 3:4 dichloro-aniline body, by condensing the dichloro-acridone further with an alpho-amino-anthraquinone body and heating the resulting product with a metal chloride, which coloring matters are, in general, dark brown powders containing combined chlorine, insoluble in water, alcohol, alkalies and dilute mineral acids, somewhat soluble in aniline, but readily soluble in concentrated sulphuric acid, forming a brown colored solution and giving with alkaline hydrosulphite a violet colored vat from which cotton is dyed violet changing to a brown shade on treatment with suitable oxidizing agents.

In testimony whereof we have hereunto subscribed our names.

IVAN GUBELMANN.
ROBERT J. GOODRICH.
WILLIAM DETTWYLER.